United States Patent
Takizawa et al.

(10) Patent No.: US 11,404,925 B2
(45) Date of Patent: Aug. 2, 2022

(54) PERMANENT MAGNET MOTOR

(71) Applicant: Mitsubishi Electric Corporation, Tokyo (JP)

(72) Inventors: Yuji Takizawa, Tokyo (JP); Satoru Akutsu, Tokyo (JP); Masafumi Okazaki, Tokyo (JP); Natsumi Sugi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/477,606

(22) PCT Filed: Apr. 26, 2017

(86) PCT No.: PCT/JP2017/016484
§ 371 (c)(1),
(2) Date: Jul. 12, 2019

(87) PCT Pub. No.: WO2018/198217
PCT Pub. Date: Nov. 1, 2018

(65) Prior Publication Data
US 2020/0127509 A1    Apr. 23, 2020

(51) Int. Cl.
*H02K 1/27* (2022.01)
*H02K 21/14* (2006.01)
(Continued)

(52) U.S. Cl.
CPC ........... *H02K 1/2766* (2013.01); *H02K 21/14* (2013.01); *B62D 5/04* (2013.01); *H02K 29/03* (2013.01)

(58) Field of Classification Search
CPC ........ H02K 1/2766; H02K 1/27; H02K 21/14; H02K 2213/03; H02K 29/03; B62D 5/04
(Continued)

(56) References Cited

U.S. PATENT DOCUMENTS

2006/0273678 A1    12/2006    Futami
2010/0148612 A1*    6/2010    Takemoto ............... H02K 29/03
                                                310/156.53
(Continued)

FOREIGN PATENT DOCUMENTS

CN    104756366 A    7/2015
EP    2 602 912 A2    6/2013
(Continued)

OTHER PUBLICATIONS

Notice of Reasons for Refusal dated Apr. 21, 2020, from the Japanese Patent Office in Application No. 2019-514939.
(Continued)

*Primary Examiner* — Alex W Mok
(74) *Attorney, Agent, or Firm* — Sughrue Mion, PLLC; Richard C. Turner (57) ABSTRACT

A permanent magnet motor includes a stator, and a rotor having a rotor core disposed opposing an inner side of the stator across an air gap, a permanent magnet disposed in a circumferential direction of the rotor core, and a field pole of the rotor core in which the permanent magnet is disposed, wherein the field pole has a radius smaller than an arc centered on a shaft attached to an inner side of the rotor, a multiple of a slit whose longitudinal axial direction is a radial direction of the rotor core are formed in the field pole, and an interval between a first central line positioned between a multiple of the slit and a second central line positioned between a neighboring multiple of the slit is enlarged as the first central line and the second central line head toward an outer peripheral side of the rotor core.

18 Claims, 12 Drawing Sheets

(51) Int. Cl.
*H02K 1/276* (2022.01)
*B62D 5/04* (2006.01)
*H02K 29/03* (2006.01)

(58) Field of Classification Search
USPC .................................................. 310/156.56
See application file for complete search history.

(56) References Cited

U.S. PATENT DOCUMENTS

| | | |
|---|---|---|
| 2012/0175989 A1 | 7/2012 | Mathoy |
| 2013/0140933 A1 | 6/2013 | Katsuhisa et al. |
| 2014/0001906 A1 | 1/2014 | Li et al. |
| 2014/0232231 A1* | 8/2014 | Yabe ............... H02K 1/276 310/156.51 |
| 2015/0084468 A1* | 3/2015 | Nigo ............... H02K 1/276 310/156.53 |
| 2015/0280500 A1 | 10/2015 | Nigo et al. |
| 2015/0295458 A1* | 10/2015 | Yamada ........... H02K 1/2746 310/156.66 |
| 2016/0036274 A1 | 2/2016 | Cao et al. |
| 2018/0198330 A1 | 7/2018 | Takizawa et al. |

FOREIGN PATENT DOCUMENTS

| | | |
|---|---|---|
| JP | 2004-336999 A | 11/2004 |
| JP | 2005-094968 A | 4/2005 |
| JP | 2006-014450 A | 1/2006 |
| JP | 2006-081336 A | 3/2006 |
| JP | 2010-148161 A | 7/2010 |
| JP | 2011-083168 A | 4/2011 |
| JP | 2012-105410 A | 5/2012 |
| JP | 2014-093852 A | 5/2014 |
| JP | 2008-167583 A | 7/2018 |
| WO | 2012/102030 A1 | 8/2012 |
| WO | 2014/068753 A1 | 5/2014 |
| WO | 2017056233 A1 | 4/2017 |

OTHER PUBLICATIONS

Communication dated Jul. 21, 2020, from the Indian Patent Office in Application No. 201947039918.
International Search Report for PCT/JP2017/016484, dated Jul. 18, 2017.
Communication dated Mar. 18, 2020 from European Patent Office in EP Application No. 17906893.7.
Communication dated Nov. 17, 2020 from the Japanese Patent Office in Application No. 2019-514939, 12 pages with translation.
Communication dated Nov. 3, 2020 from The State Intellectual Property Office of the P.R. of China in Application No. 201780089811.5, 14 pages with translation.
Communication dated Mar. 11, 2021, from The State Intellectual Property Office of the P.R. of China in Application No. 201780089811.5; 12 pages with translation.
Communication dated Aug. 9, 2021, from the European Patent office in application No. 17906893.7, 6 pages.

* cited by examiner

PERMANENT MAGNET MOTOR

CROSS REFERENCE TO RELATED APPLICATIONS

This application is a National Stage of International Application No. PCT/JP2017/016484 filed Apr. 26, 2017.

TECHNICAL FIELD

The present invention, relating to a permanent magnet motor, relates to a permanent magnet motor used in, for example, an electric power steering system.

BACKGROUND ART

To date, with regard to a rotor of a permanent magnet motor, a structure wherein, in order to improve demagnetization resistance of a permanent magnet, slits aligned so that neighboring intervals are practically equal are provided in a rotor core surface of an IPM (interior permanent magnet) motor has been disclosed (for example, refer to Patent Document 1).

Also, with regard to a magnet-embedded rotor of an existing motor, a structure wherein, in order to improve torque ripple, slits inclined in one direction of rotation are provided in a rotor core surface of an IPM motor has been disclosed (for example, refer to Patent Document 2).

The previously described kinds of existing IPM motor have a main object of achieving an improvement in demagnetization resistance or torque ripple. In the case of demagnetization resistance improvement, there is no need to adopt a complicated structure wherein slits are provided in a rotor surface as disclosed in Patent Document 1, as it is sufficient to apply a permanent magnet with a high coercive force. Also, in the case of torque ripple reduction, a structure having the kind of perfectly circular external rotor form disclosed in Patent Document 2 is a form such that torque ripple worsens, so is not appropriate.

Generally, an IPM has greater demagnetization resistance than a surface permanent magnet (SPM), and reluctance torque can be utilized, because of which a small motor with a high output can be realized by increasing an amount of current, thereby increasing torque density.

CITATION LIST

Patent Literature

Patent Document 1: JP-A-2006-081336
Patent Document 2: JP-A-2006-014450

SUMMARY OF INVENTION

Technical Problem

In this case, differing from an SPM, an IPM is such that a face opposing a stator inner diameter forms a rotor core with high magnetic permeability, because of which a magnetic flux that crosses a magnetic pole surface in a circumferential direction increases, and an air gap magnetic flux density is more liable to become locally excessive compared with an SPM.

An existing permanent magnet motor is such that due to a local increase in magnetic flux density in an air gap, an electromagnetic excitation force proportional to two times the magnetic flux density acts, attempting to cause a stator to transform, because of which there is a problem in that motor vibration noise worsens. As reducing the motor current or enlarging the air gap causes the torque density to decrease, the advantages of reducing size and increasing output with respect to an SPM are cancelled out.

The invention, having been contrived in order to resolve the heretofore described kind of problem, has an object of providing a permanent magnet motor such that a worsening of motor vibration noise can be restricted while securing a reduction in size and an increase in output, which are advantages of an IPM.

Solution to Problem

A permanent magnet motor according to the invention includes a stator, and a rotor having a rotor core disposed opposing an inner side of the stator across an air gap, a permanent magnet disposed in a circumferential direction of the rotor core, and a field pole of the rotor core in which the permanent magnet is disposed, wherein the field pole has a radius smaller than an arc centered on a shaft attached to an inner side of the rotor, a multiple of a slit whose longitudinal axial direction is a radial direction of the rotor core are formed in the field pole, and an interval between a first central line positioned between a multiple of the slit and a second central line positioned between a neighboring multiple of the slit is enlarged as the first central line and the second central line head toward an outer peripheral side of the rotor core.

Advantageous Effects of Invention

According to the permanent magnet motor of the invention, a worsening of vibration noise due to torque ripple and frame vibration can be restricted while securing a reduction in size and an increase in output, which are advantages of an IPM. Therefore, a permanent magnet motor appropriate for use in an electric power steering system or the like can be obtained.

DESCRIPTION OF EMBODIMENTS

Hereafter, a first embodiment of the invention will be described, based on the drawings.

Identical reference signs in the drawings indicate identical or corresponding components.

First Embodiment

Figure 1:
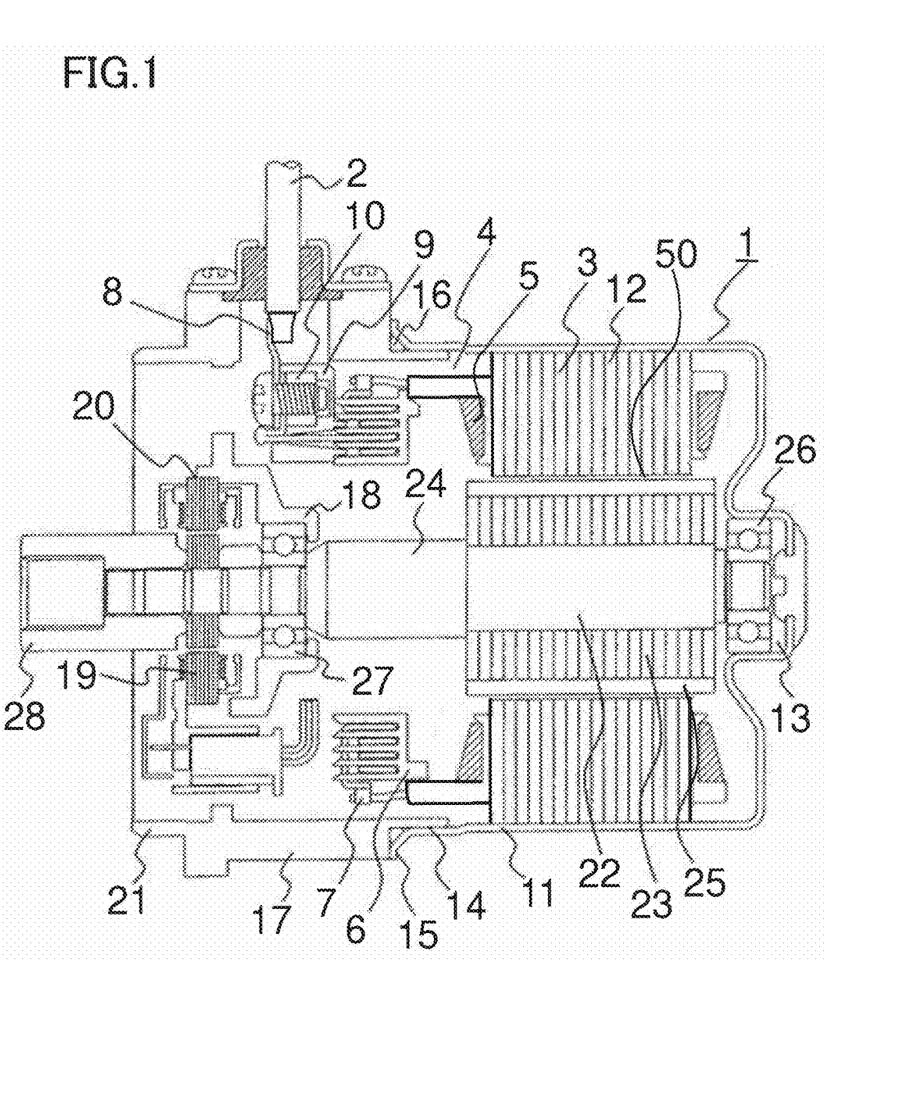
FIG. 1 is an axial direction sectional view of a permanent magnet motor in a first embodiment of the invention.

FIG. 1 is an axial direction sectional view of a permanent magnet motor in a first embodiment of the invention.

As shown in FIG. 1, a permanent magnet motor (hereafter referred to simply as "motor") 1 has a rotor core 23 in whose interior a multiple of permanent magnets 25 are disposed, has a rotor 22 supported so as to rotate freely, a stator winding 5, and a stator core 3, and includes a stator 12 provided across an air gap 50 on an outer side of the rotor 22.

The stator core 3 is formed by, for example, plate-form electromagnetic steel sheets being stacked, and the three-phase stator winding 5 is wound around the stator core 3 across an insulator 4 made of resin. The stator windings 5 of each phase are delta-connected by a winding terminal 7 housed in a terminal holder 6 made of resin. Furthermore, a connection terminal 8 for connecting to a lead wire 2 is attached to the winding terminal 7 of each phase. The connection terminal 8 is attached to a connection terminal base portion 9, and a nut 10 for attaching the lead wire 2 to the connection terminal 8 is housed in an interior of the connection terminal base portion 9.

The stator core 3 is press-fitted into a frame 11 made of iron, forming the stator 12 of the motor 1. There is a bottom portion in one end portion of the frame 11, and a rear bearing box portion 13 that houses a rear bearing 26 for supporting one end of the rotor 22 is formed in a central portion of the bottom portion. Another end portion of the frame 11 is opened, and a spigot joint portion 14 for linking to a housing 17 of the motor 1 is formed. A flange portion 15 having a screw clamping portion for screwing the stator 12 to the housing 17 of the motor 1 is formed on an outer periphery of the spigot joint portion 14 of the frame 11. An O-ring-form frame grommet 16 for waterproofing is provided between the housing 17 of the motor 1 and the flange portion 15 of the stator 12.

The housing 17 of the motor 1 is formed by a die casting of an aluminum alloy, and a front bearing box 18 that houses a front bearing 27 for supporting one end of the rotor 22 is formed in a central portion. Also, a resolver mounting portion 20 for attaching a resolver 19, which is a rotation sensor for detecting an angle of rotation of the rotor 22, is formed in a vicinity of the front bearing box 18 of the housing 17. A mounting spigot joint portion 21 for attaching the motor 1 to a mating instrument is provided in an end portion of the housing 17 on a side opposite to a side on which the stator 12 is attached.

The rotor 22 includes the rotor core 23, which is formed by electromagnetic steel sheets attached to an iron shaft 24 being stacked. Further, either end of the shaft 24 is supported by the rear bearing 26 and the front bearing 27 so as to rotate freely. A boss 28, which is coupling for linking to a mating instrument, is attached to a front side end portion of the shaft 24.

Figure 2A:
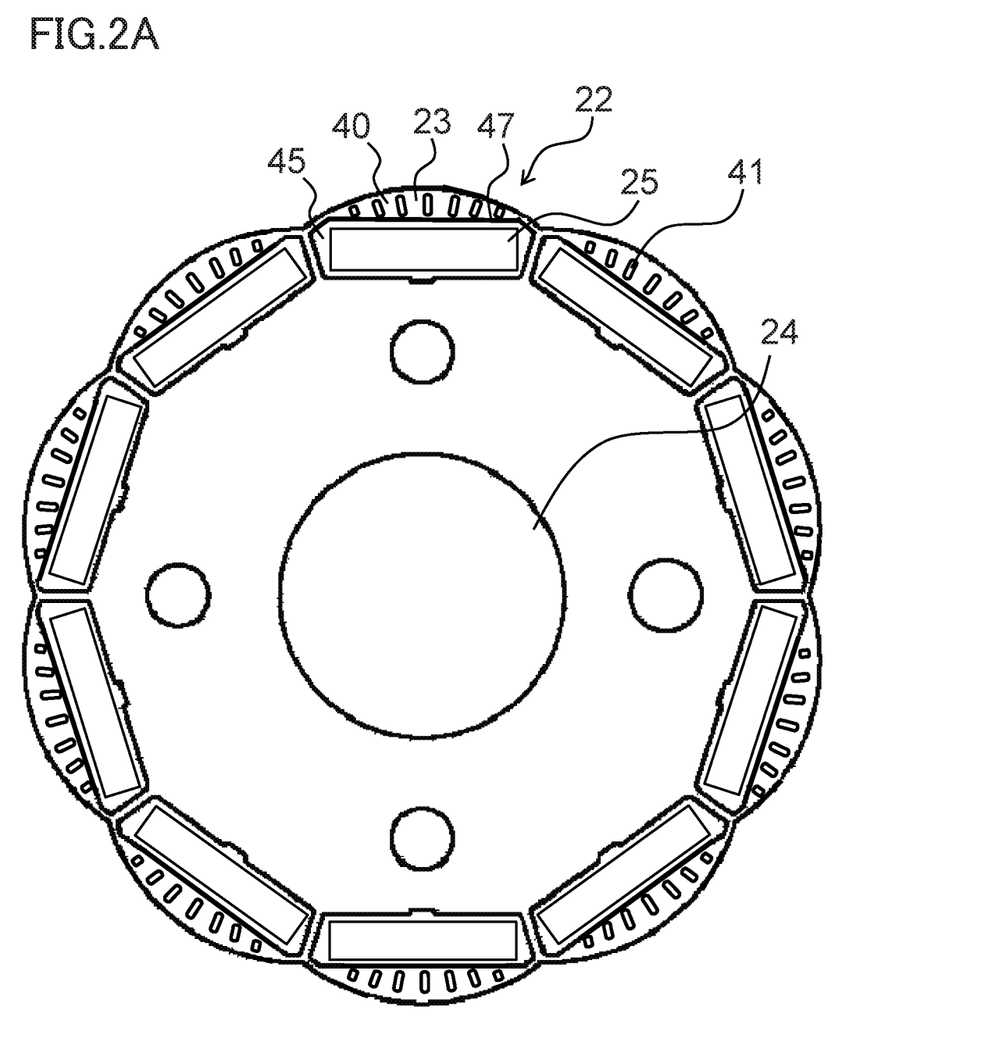
FIG. 2A is a front view of a rotor of the permanent magnet motor in the first embodiment of the invention.
Figure 2B:
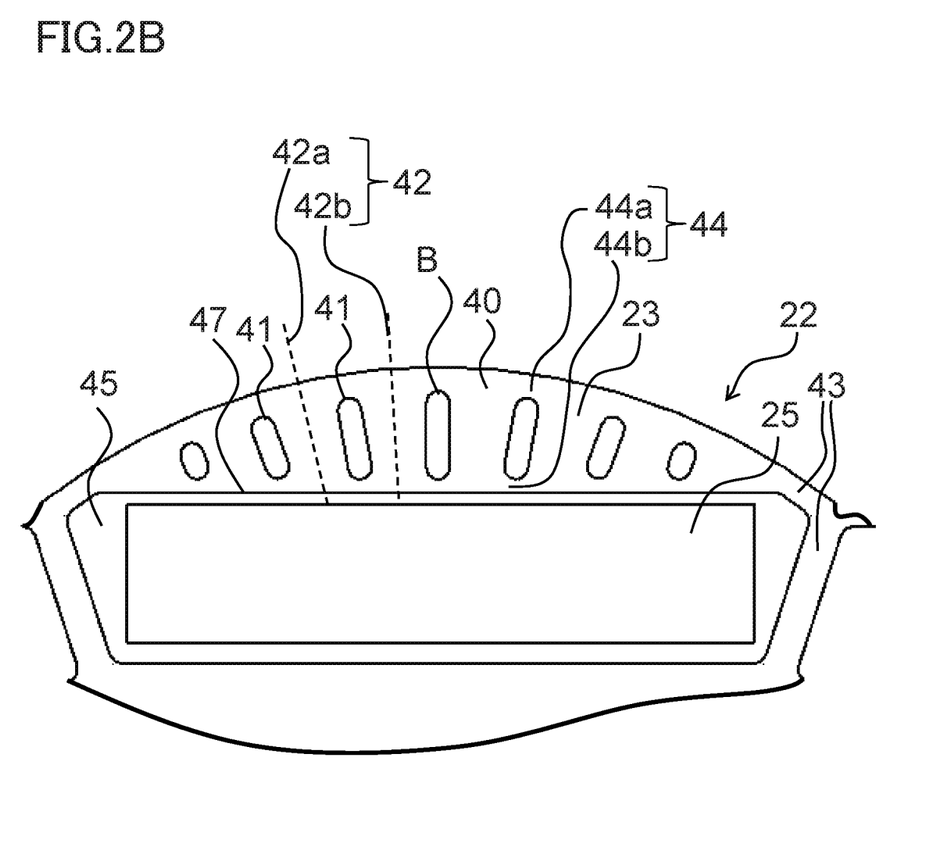
FIG. 2B is a front view of the rotor of the permanent magnet motor in the first embodiment of the invention.

FIG. 2A and FIG. 2B are front views of a rotor of a permanent magnet motor in the first embodiment of the invention. Also, FIG. 2B is an enlarged view of FIG. 2A. As shown in FIG. 2A and FIG. 2B, the multiple of permanent magnets 25 are disposed in the circumferential direction in the rotor core 23 of the rotor 22. The multiple of permanent magnets 25 are housed and fixed in a multiple of permanent magnet mounting holes 47 disposed at equal intervals in the circumferential direction in the rotor core 23, and a gap portion 45 is formed on both sides of the permanent magnet 25. FIG. 2A and FIG. 2B are centered on the rotor 22. Therefore, a depiction of the stator 12 provided across the air gap 50 on an outer periphery of the rotor 22 is omitted. The stator 12 has the stator core 3, which has a multiple of teeth 48 and a multiple of slots (not shown), and an armature winding (not shown) wound around the teeth 48 and housed in the slots.

Rather than being a perfect circle centered on the shaft 24, the rotor core 23 in the first embodiment of the invention has a floral form, and includes a multiple of slits 41 in a field pole 40 of the rotor core 23 in which the permanent magnet 25 is disposed. The field pole 40 has a radius smaller than an arc centered on the shaft 24, which is attached on an inner side of the rotor 22. Also, the multiple of slits 41, whose longitudinal axial direction is a radial direction of the rotor core 23, are formed in the field pole 40.

Also, the rotor core 23 of the field pole 40 is between slits 41, and central lines 42 between slits 41 are set so as to spread farther apart the nearer the central lines 42 come to an outer peripheral side. That is, the slits 41 are provided so that an interval between a first central line 42a between slits 41 and a second central line 42b between neighboring slits 41 becomes gradually wider as the first central line 42a and the second central line 42b head toward the outer peripheral side of the rotor 22. For example, seven slits 41 are disposed in each field pole 40 (=one magnetic pole portion). Also, an odd number of slits 41 are disposed axisymmetrically sandwiching a central slit B disposed in a center of the field pole 40, and lengths of the slits 41 are axisymmetrically the same. A circumferential direction width of the permanent magnet 25 is greater than a radial direction width, and the permanent magnet 25 is of a flat plate magnet form.

Also, a connection portion 44 is provided in order to integrate the field pole 40 divided by the slits 41. The field pole 40 divided by the slits 41 is integrated by the connection portion 44.

Figure 2C:
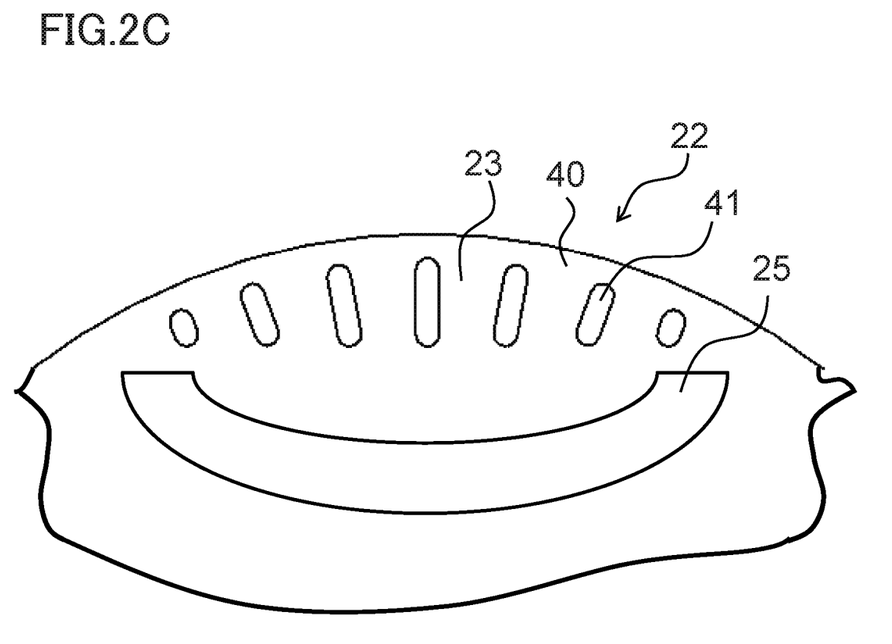
FIG. 2C is a front view of the rotor of the permanent magnet motor in the first embodiment of the invention.
Figure 2D:
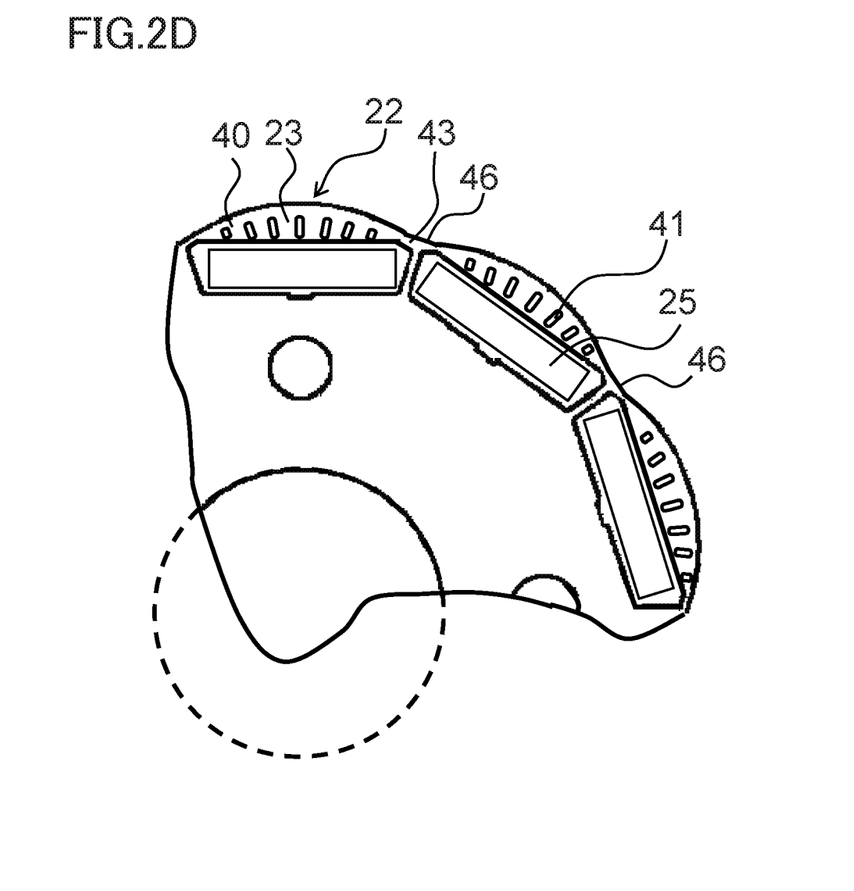
FIG. 2D is a front view of the rotor of the permanent magnet motor in the first embodiment of the invention.
Figure 2E:
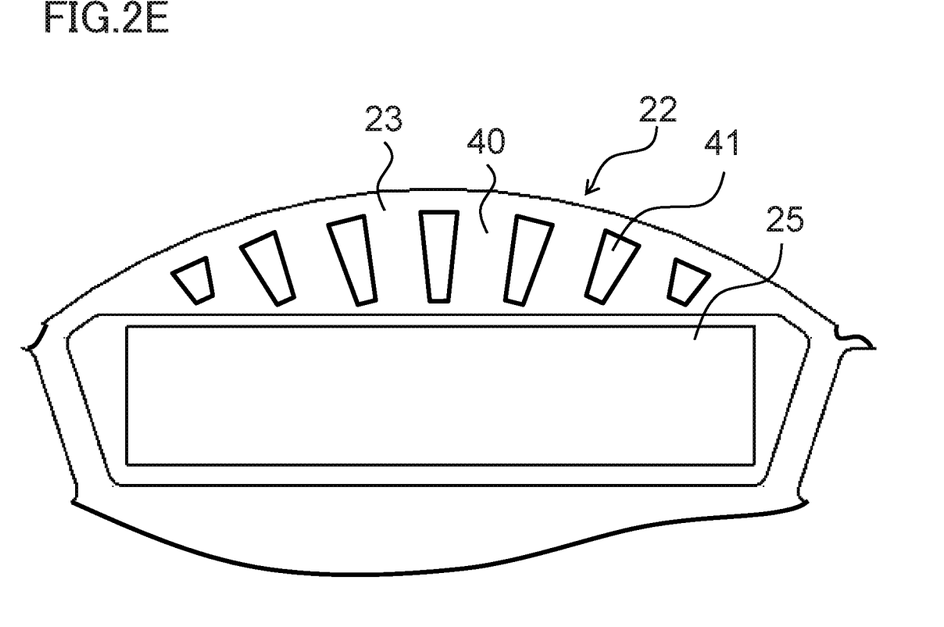
FIG. 2E is a front view of the rotor of the permanent magnet motor in the first embodiment of the invention.

Also, FIG. 2C to FIG. 2E are front views of a rotor of a permanent magnet motor that is another working example in the first embodiment of the invention. In FIG. 2C, a form of the permanent magnet 25 is a curved form, but structures excepting the permanent magnet 25 and a form of a permanent magnet mounting hole are the same as the structures in FIG. 2A.

Further still, in FIG. 2D, a form of the rotor core 23 opposing a bridge portion 43 is of a perfectly circular form 46, but structures excepting this form are the same as the structures in FIG. 2A.

Also, in FIG. 2E, a form of the slit 41 is trapezoidal, but structures excepting the form of the slit 41 are the same as the structures in FIG. 2A.

Figure 3:
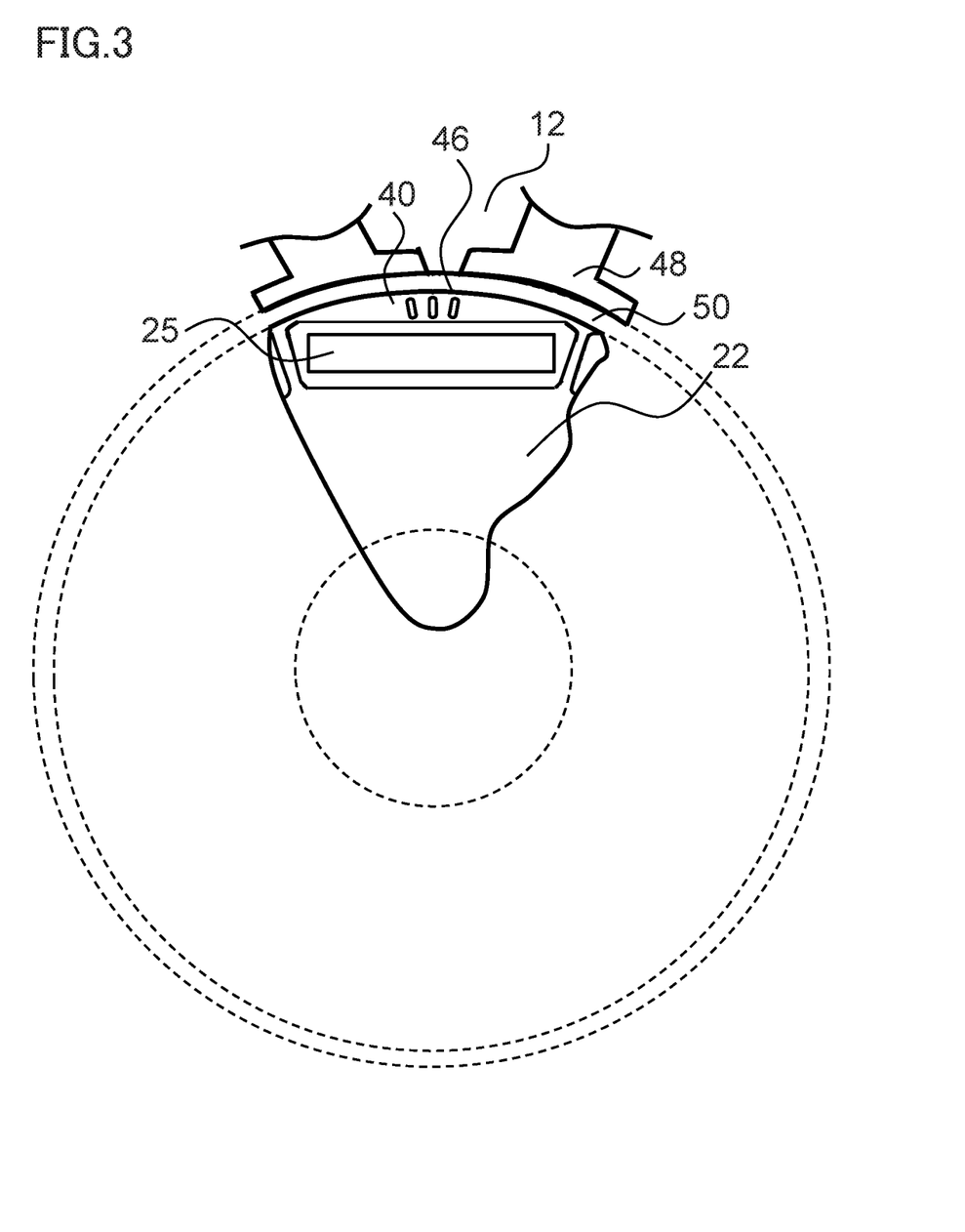
FIG. 3 is a front view of a permanent magnet motor in a comparative example.
Figure 4:
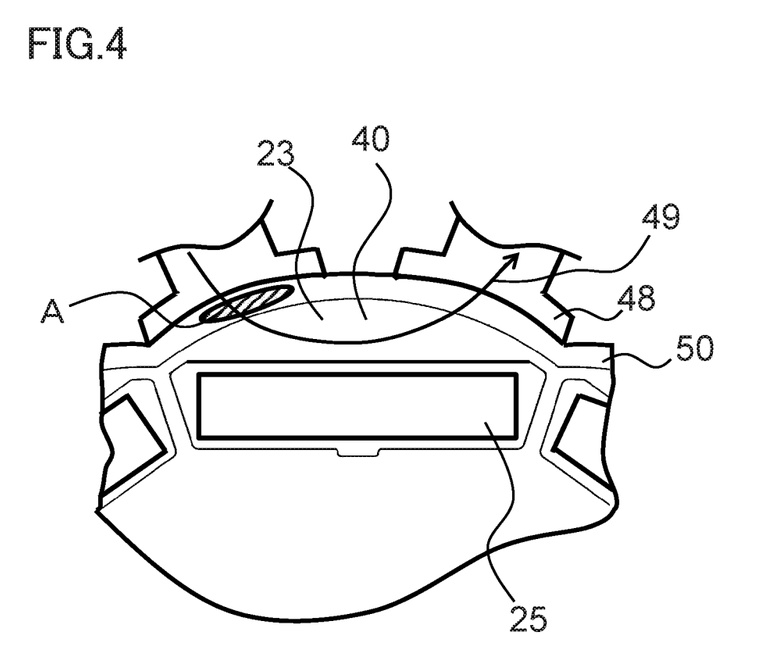
FIG. 4 is a front view of a permanent magnet motor in a comparative example.
Figure 5:
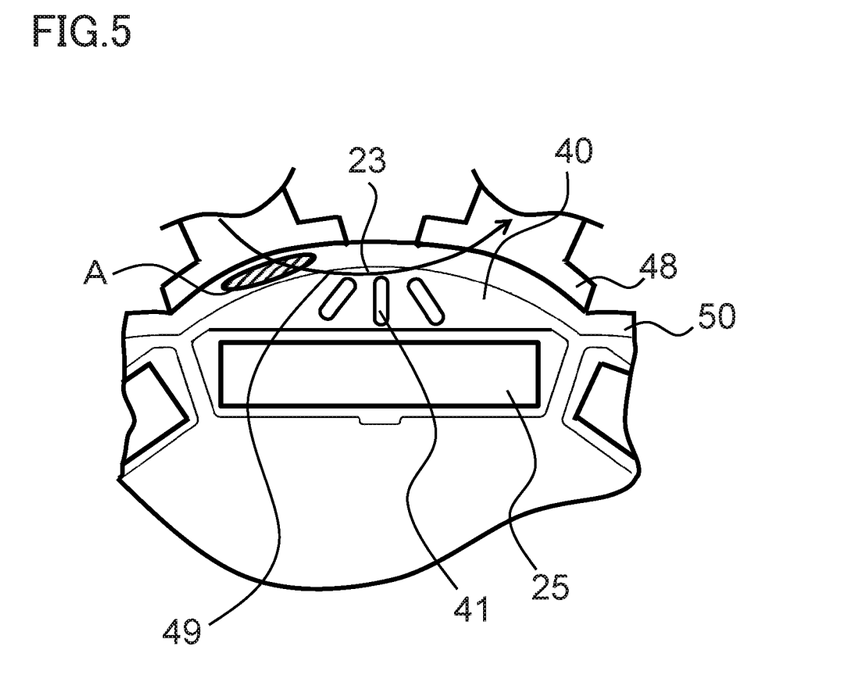
FIG. 5 is a front view of a permanent magnet motor in a comparative example.

FIG. 3 to FIG. 5 are front views of a permanent magnet motor in a comparative example. FIG. 3 to FIG. 5 show the teeth 48 of the stator 12 provided across the air gap 50 on the outer side of the rotor 22. In FIG. 3, the external form of the rotor 22 is the perfectly circular form 46, because of which torque ripple increases. Also, in FIG. 4, no slit 41 is provided in the rotor core 23, because of which a magnetic flux 49 crossing the field pole 40 of the rotor core 23 flows, and magnetic flux density in a region A of the air gap 50 increases. Also, in FIG. 5, the intervals between the slits 41 become smaller the nearer to the outer peripheral side of the rotor core 23, and there is no longer an advantage of the magnetic flux density of the air gap 50 being dispersed because of the slits 41.

Meanwhile, in the first embodiment of the invention, a particularly noticeable advantage can be exhibited with poles and slots such as 10 poles and 12 slots, 14 poles and 12 slots, or 14 poles and 18 slots, wherein a mode such that a low order electromagnetic excitation force mode is small and vibration noise is liable to increase, for example, a secondary mode all round, occurs.

One of the slits 41 is in the center of the field pole 40. The center of the field pole 40 is the place in which a sectional area of the field pole 40 with respect to the crossing magnetic flux 49 is greatest and the magnetic flux 49 flows most easily, and an advantage in that the magnetic flux 49 is interrupted by the slit 41 is obtained.

When increasing the slits 41 until magnetic saturation occurs in the field pole 40, an advantage of restricting vibration noise is easily obtained, but torque decreases, because of which the advantage of restricting vibration noise is obtained, without increasing a physical structure of the motor 1, by the length of the rotor core 23 (the length of the permanent magnet 25 too) being greater than the length of the stator core 3.

Second Embodiment

Figure 6A:
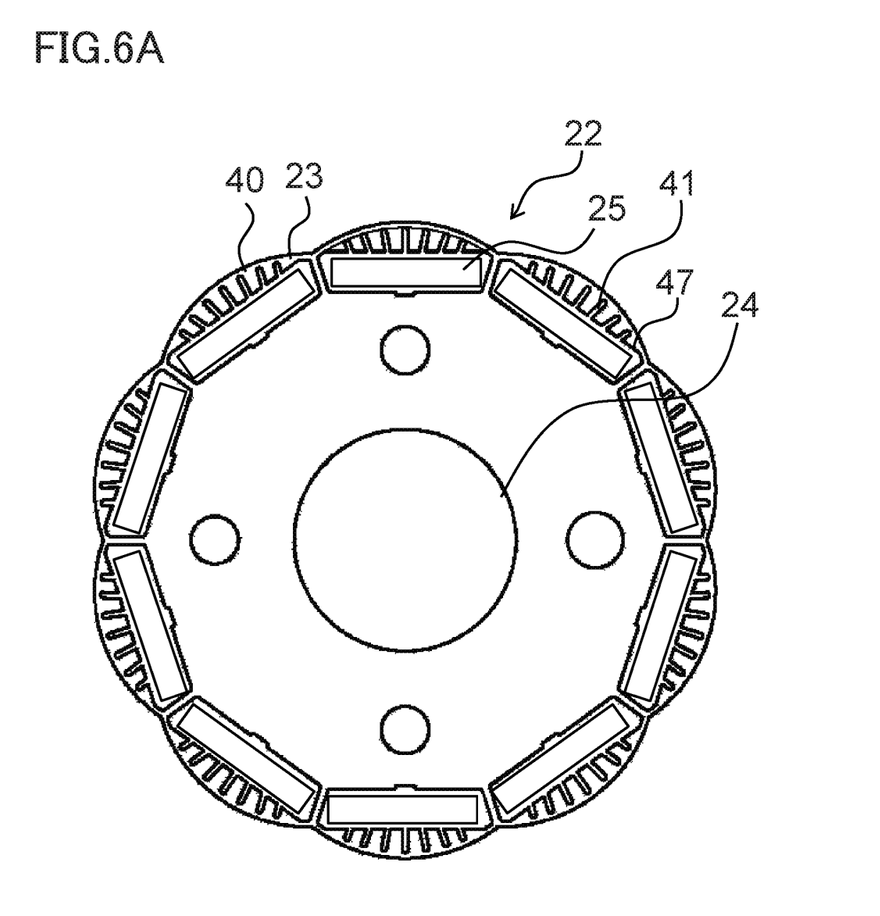
FIG. 6A is a front view of a rotor of a permanent magnet motor in a second embodiment of the invention.
Figure 6B:
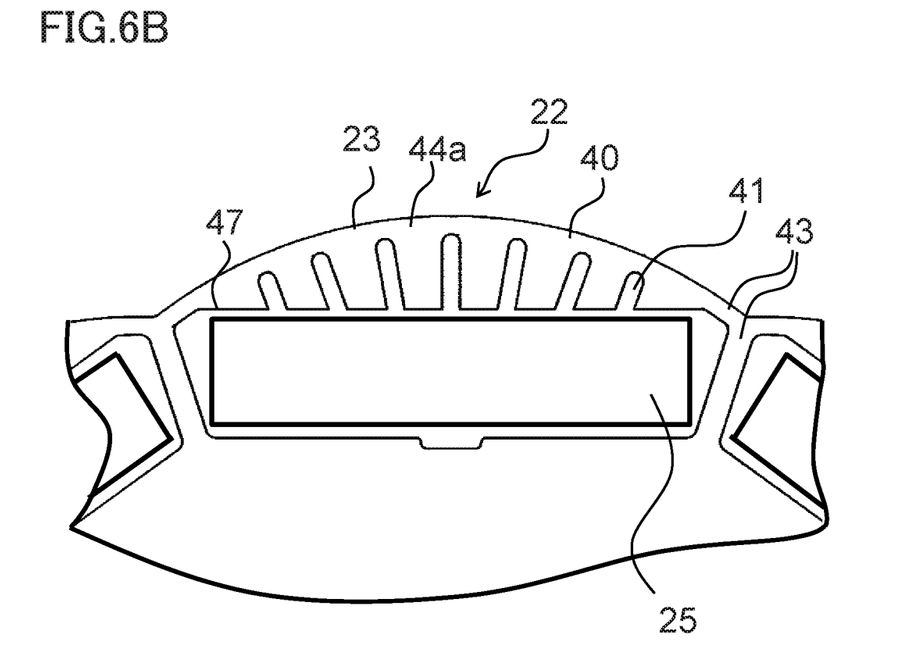
FIG. 6B is a front view of the rotor of the permanent magnet motor in the second embodiment of the invention.

FIG. 6A and FIG. 6B are front views of a rotor of a permanent magnet motor in a second embodiment of the invention. Also, FIG. 6B is an enlarged view of FIG. 6A. As shown in FIG. 6A and FIG. 6B, the multiple of permanent magnets 25 are disposed in the circumferential direction in the rotor core 23 of the rotor 22. In FIG. 6A and FIG. 6B, one side of the slit 41 is in an opened state. Specifically, a connection portion (field pole upper side) 44a is provided in the connection portion 44, but no connection portion (field pole lower side) 44b is provided, the permanent magnet mounting hole 47 and one side of the multiple of slits 41 are in a connected state, and one side of the multiple of slits 41 is in an opened state. When the connection portion (field pole lower side) 44b exists, the magnetic flux 49 of a surface of the field pole 40 flows around to a back face of the permanent magnet 25 via the connection portion (field pole lower side) 44b and the bridge portion 43, because of which there is a decrease in the magnetic flux 49 that should flow from the field pole 40 via the air gap 50 to the stator 12 and become torque.

As the connection portion (field pole lower side) 44b is not provided in the second embodiment of the invention, a reduction in magnetic flux can be further reduced. Therefore, there is less flowing around of magnetic flux due to the connection portion (field pole lower side) 44b than in the first embodiment, because of which there is an advantage in that the advantage of the slit 41 increases further.

Third Embodiment

Figure 7:
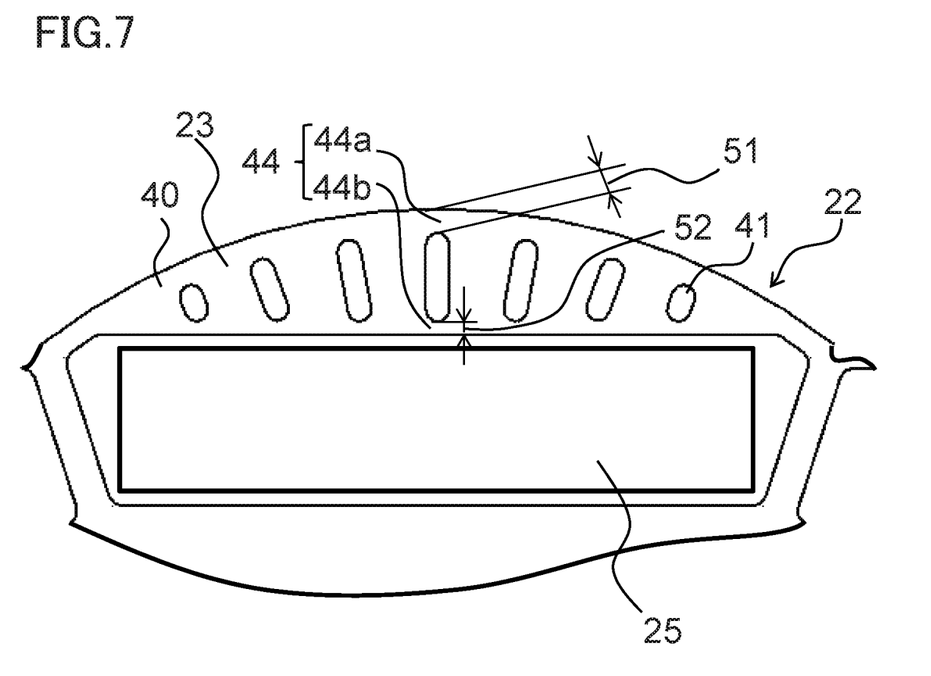
FIG. 7 is a front view of a rotor of a permanent magnet motor in a third embodiment of the invention.

FIG. 7 is a front view of a rotor of a permanent magnet motor in a third embodiment of the invention. In the third embodiment, as shown in FIG. 7, connection portion widths 51 and 52 (radial direction widths) are smaller than an electromagnetic steel plate thickness. Because of this, a flowing around of magnetic flux due to the connection portion 44 decreases, because of which there is an advantage in that the advantage of the slit 41 is more easily obtained.

The embodiments can be freely combined, and each embodiment can be modified or abbreviated as appropriate, without departing from the scope of the invention.

REFERENCE SIGNS LIST

1 motor, 2 lead wire, 3 stator core, 4 insulator, 5 stator winding, 6 terminal holder, 7 winding terminal, 8 connection terminal, 9 connection terminal base portion, 10 nut, 11 frame, 12 stator, 13 rear bearing box portion, 14 spigot joint portion, 15 flange portion, 16 frame grommet, 17 housing, 18 front bearing box, 19 resolver, 20 resolver mounting portion, 21 mounting spigot joint portion, 22 rotor, 23 rotor core, 24 shaft, 25 permanent magnet, 26 rear bearing, 27 front bearing, 28 boss, 40 field pole, 41 slit, 42 central line, 42a first central line, 42b second central line, 43 bridge portion, 44 connection portion, 44a connection portion (field pole upper side), 44b connection portion (field pole lower side), 45 gap portion, 46 perfectly circular form, 47 permanent magnet mounting hole, 48 teeth, 49 magnetic flux, 50 air gap, 51 connection portion width, 52 connection portion width

The invention claimed is:
1. A permanent magnet motor, comprising:
a stator; and
a rotor attached to a shaft and comprising:
a rotor core disposed opposing an inner side of the stator across an air gap,
a plurality of field poles which are adjacently formed, as convex shapes, at an outer side of the rotor core, wherein a periphery of the rotor core is formed by outer points of the convex shapes, proximate the inner side of the stator,
a permanent magnet disposed in each of the plurality of field poles, respectively, in a circumferential direction of the rotor core, and
a plurality of slits whose longitudinal axial direction is a radial direction of the rotor core, which are formed in the plurality of field poles, respectively, and extend toward an outer peripheral side of the rotor core,
wherein a radius of each of the plurality of field poles is smaller than a radius of an arc which comprises the outer points of the convex shapes and is centered on the shaft,
a distance between a first central line positioned between a first pair of the plurality of slits and a second central line positioned between a second pair of the plurality of slits, which neighbors the first pair, becomes greater as the first central line and the second central line extend toward the outer peripheral side of the rotor core,
the rotor core is formed by electromagnetic steel sheets stacked on the shaft, and each of electromagnetic steel sheets is formed in a shape of a plate,
a first connection portion that integrates each of the plurality of field poles that is divided by the plurality of slits is provided on the outer peripheral side of each of the plurality of field poles,
a second connection portion that integrates each of the plurality of field poles that is divided by the plurality of slits is provided on a side of the plurality of slits that is opposite to the outer peripheral side of each of the plurality of field poles, and
a radial direction width of the first connection portion and the second connection portion, respectively, of each of the plurality of field poles is made smaller than a thickness of the electromagnetic steel plate.

2. The permanent magnet motor according to claim 1, wherein the plurality of slits are disposed axisymmetrically sandwiching a central slit disposed in a circumferential direction center of each of the plurality of field poles.

3. The permanent magnet motor according to claim 2, wherein an odd number of the plurality of slits is disposed in each of the plurality of field poles.

4. The permanent magnet motor according to claim 2, wherein the stator includes a stator core having a plurality of teeth and a plurality of slots, and
an axial direction length of the rotor core is greater than an axial direction length of the stator core.

5. The permanent magnet motor according to claim 2, wherein the permanent magnet has a flat plate form such that a circumferential direction width of the permanent magnet is greater than a radial direction width thereof.

6. The permanent magnet motor according to claim 2, wherein an external form of the rotor is a floral form.

7. The permanent magnet motor according to claim 2, wherein the permanent magnet is fixed in a permanent magnet mounting hole.

8. The permanent magnet motor according to claim 1, wherein an odd number of the plurality of slits is disposed in each of the plurality of field poles.

9. The permanent magnet motor according to claim 8, wherein the stator includes a stator core having a plurality of teeth and a plurality of slots, and
an axial direction length of the rotor core is greater than an axial direction length of the stator core.

10. The permanent magnet motor according to claim 8, wherein the permanent magnet has a flat plate form such that a circumferential direction width of the permanent magnet is greater than a radial direction width thereof.

11. The permanent magnet motor according to claim 8, wherein an external form of the rotor is a floral form.

12. The permanent magnet motor according to claim 8, wherein the permanent magnet is fixed in a permanent magnet mounting hole.

13. The permanent magnet motor according to claim 1, wherein the stator includes a stator core having a plurality of teeth and a plurality of slots, and
an axial direction length of the rotor core is greater than an axial direction length of the stator core.

14. The permanent magnet motor according to claim 1, wherein the permanent magnet has a flat plate form such that a circumferential direction width of the permanent magnet is greater than a radial direction width thereof.

15. The permanent magnet motor according to claim 1, wherein an external form of the rotor is a floral form.

16. The permanent magnet motor according to claim 1, wherein the permanent magnet is fixed in a permanent magnet mounting hole.

17. The permanent magnet motor according to claim 1, wherein each of the plurality of field poles comprises a permanent magnet mounting hole, and
the permanent magnet is disposed in the permanent magnet mounting hole such that an air gap is formed between each side of the permanent magnet and the rotor core.

18. The permanent magnet motor according to claim 1, wherein the plurality of slits are disposed axisymmetrically sandwiching a central slit that has a greatest length and is disposed in a circumferential direction center of each of the plurality of field poles, and
lengths of peripheral slits of the plurality of slits that sandwich the central slit gradually decrease in a direction away from the central slit and are axisymmetrically the same.

* * * * *